US010221684B2

(12) United States Patent
Westacott et al.

(10) Patent No.: US 10,221,684 B2
(45) Date of Patent: Mar. 5, 2019

(54) DETERMINING CORE SAMPLE VOLUME WITHIN A SEALED PRESSURE VESSEL (71) Applicant: HALLIBURTON ENERGY SERVICES, INC., Houston, TX (US)

(72) Inventors: Donald Clifford Westacott, Spring, TX (US); Anthony Herman Van Zuilekom, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 7 days.

(21) Appl. No.: 15/554,400

(22) PCT Filed: May 15, 2015

(86) PCT No.: PCT/US2015/031176
§ 371 (c)(1),
(2) Date: Aug. 29, 2017

(87) PCT Pub. No.: WO2016/186626
PCT Pub. Date: Nov. 24, 2016

(65) Prior Publication Data
US 2018/0051559 A1 Feb. 22, 2018

(51) Int. Cl.
E21B 49/00 (2006.01)
E21B 49/06 (2006.01)
E21B 47/00 (2012.01)
G01V 1/30 (2006.01)

(52) U.S. Cl.
CPC ............ *E21B 49/005* (2013.01); *E21B 47/00* (2013.01); *E21B 49/00* (2013.01); *E21B 49/06* (2013.01); *G01V 1/306* (2013.01)

(58) Field of Classification Search
CPC ............... E21B 49/005; E21B 47/00

USPC .......................................... 175/40
See application file for complete search history.

(56) References Cited

U.S. PATENT DOCUMENTS

| 7,121,338 B2 * | 10/2006 | van Zuilekom .... E21B 33/1216 166/264 |
| 2003/0209066 A1 | 11/2003 | Goodwin |
| 2004/0123645 A1 | 7/2004 | Storm, Jr. et al. |
| 2005/0182566 A1 | 8/2005 | DiFoggio |

(Continued)

OTHER PUBLICATIONS

International Search Report and Written Opinion for International Application No. PCT/US2015/031176 dated May 15, 2015. (10 pages).

*Primary Examiner* — Taras P Bemko
(74) *Attorney, Agent, or Firm* — Haynes and Boone LLP (57) ABSTRACT A method for determining the volume of core samples disposed within a sealed pressure vessel, the sealed pressure vessel containing a prefill fluid having a density, the method including determining the internal volume of the pressure vessel; determining the density of the prefill fluid; determining, using at least one of one or more computers, the net density of the core samples disposed within the sealed pressure vessel; determining, using at least one of the one or more computers, the density of one or more earth strata proximate the respective in situ locations of the core samples; and calculating, using at least one of the one or more computers, the volume of the core samples disposed within the sealed pressure vessel. In an exemplary embodiment, the core samples are sealed within the pressure vessel when the pressure vessel is disposed within an oil or gas wellbore.

20 Claims, 7 Drawing Sheets (56) References Cited

U.S. PATENT DOCUMENTS

| | | | |
|---|---|---|---|
| 2013/0025855 A1* | 1/2013 | Glattetre | E21B 49/10 166/264 |
| 2013/0199847 A1* | 8/2013 | Delmar | E21B 25/00 175/44 |
| 2013/0239664 A1 | 9/2013 | Hsu et al. | |
| 2013/0239671 A1 | 9/2013 | Gisolf et al. | |
| 2013/0311099 A1* | 11/2013 | Eyuboglu | E21B 49/08 702/11 |
| 2015/0015412 A1* | 1/2015 | Abbassian | E21B 44/00 340/854.4 |
| 2016/0334537 A1* | 11/2016 | Li | G01V 7/06 |
| 2017/0089158 A1* | 3/2017 | Gupta | E21B 25/005 |

* cited by examiner

DETERMINING CORE SAMPLE VOLUME WITHIN A SEALED PRESSURE VESSEL

TECHNICAL FIELD

The present disclosure relates generally to coring operations conducted within an oil or gas wellbore and, more specifically, to enhancing the efficiency of core sample recovery by determining the volume of core samples contained within a sealed pressure vessel.

BACKGROUND

In the process of conducting coring operations within an oil or gas wellbore, a coring tool is run downhole by wireline conveyance and multiple core samples are cut from the wellbore. The core samples are placed within a pressure vessel in the wellbore. The pressure vessel is then sealed downhole with a plug that retains the recovered core samples and fluids during recovery of the pressure vessel to the surface. The core samples are subsequently shipped offsite for detailed laboratory analysis. The sealed pressure vessel containing the core samples cannot be opened outside of the laboratory without risking adverse effects on the quality and integrity of the core samples. Further, the use of certain implements to determine the volume of the core samples within the pressure vessel such as, for example, X-ray machines and/or CT scan machines, is often precluded by the design and construction of the pressure vessel itself. As a result, the volume of the core samples within the pressure vessel recovered from the wellbore is often unknown before the pressure vessel is opened in the laboratory. Thus, the volume of the core samples within the pressure vessel typically cannot be determined until after the necessary coring equipment and personnel have left the wellsite. Accordingly, a method for determining the volume of the core samples within the pressure vessel at the wellsite would allow for additional coring operations to be conducted, if necessary, while the required equipment and personnel are still available at the wellsite.

BRIEF DESCRIPTION OF THE DRAWINGS

Various embodiments of the present disclosure will be understood more fully from the detailed description given below and from the accompanying drawings of various embodiments of the disclosure. In the drawings, like reference numerals may indicate identical or functionally similar elements.

DETAILED DESCRIPTION

Illustrative embodiments and related methods of the present disclosure are described below as they might be employed in a method and/or apparatus for determining core sample volume within a sealed pressure vessel. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The following disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe the relationship of one element or feature to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Figure 1:
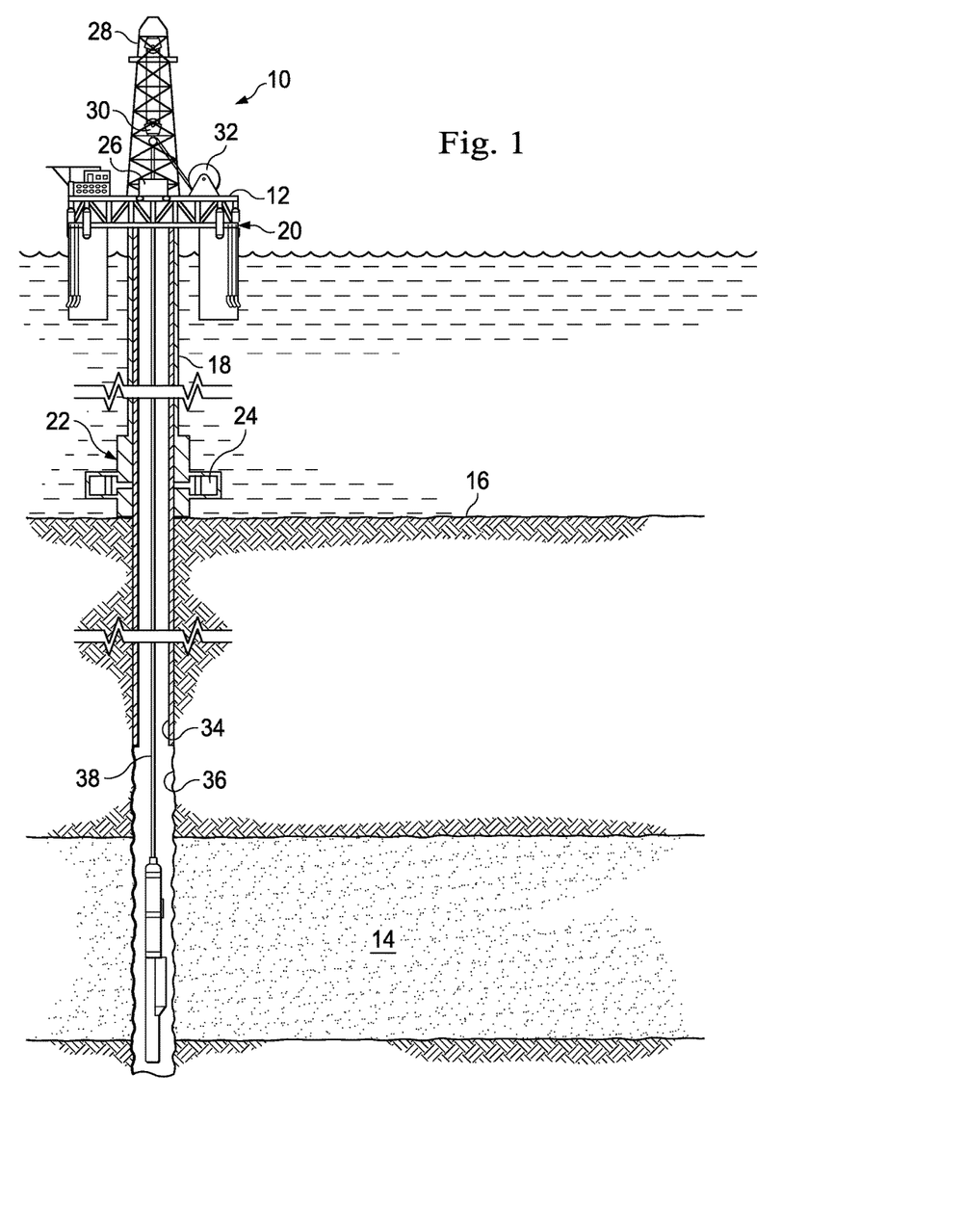
FIG. 1 is a schematic illustration of an offshore oil and gas platform operably coupled to a rotary coring tool disposed within a wellbore, according to an exemplary embodiment.

In an exemplary embodiment, as illustrated in FIG. 1, an offshore oil or gas platform is schematically illustrated and generally designated by the reference numeral 10. A semi-submersible platform 12 is positioned over a submerged oil and gas formation 14 located below a sea floor 16. A subsea conduit 18 extends from a deck 20 of the platform 12 to a subsea wellhead installation 22, which may include blowout preventers 24. The platform 12 has a hoisting apparatus 26, a derrick 28, a travel block 30, and a wireline spool 32. A wellbore 36 extends through the various earth strata, including the formation 14, and may include a casing string 34 cemented in a portion thereof. The platform 12 may also include a hook (not shown) and a swivel (not shown) for raising and lowering pipe strings during drilling operations, such as a substantially tubular, axially extending drill string (not shown). During drilling operations, an annulus is defined between the wellbore 36 and the drill string. In an exemplary embodiment, the wellbore 36 is drilled by rotating the drill string via a rotary table or top-drive (not shown) while applying weight to the drill string 36, thereby rotating a rotary drill bit (not shown) against the bottom of the wellbore 36. As the rotary drill bit drills through the various earth strata, including the formation 14, a drilling fluid (not shown) is circulated from the surface, through the drill string and the rotary drill bit, and into the wellbore 36, thereby clearing away and carrying drill cuttings to the surface through the annulus. Once the wellbore 36 has been partially or entirely drilled, the drill string is removed from the wellbore 36 so that other operations may be performed within the wellbore 36 such as, for example, a sidewall coring operation, as will be discussed in further detail below.

In an exemplary embodiment, with continuing reference to FIG. 1, once the drill string has been removed from the wellbore 36, a rotary coring tool 100 is conveyed into the wellbore 36 by a wireline 38. The wireline 38 is unwound from the wireline spool 32, attached to the rotary coring tool 100, and fed into the wellbore 36. In an alternate embodiment, the rotary coring tool 100 is conveyed into the wellbore 36 by wired coiled tubing. In another alternate embodiment, the rotary coring tool 100 is conveyed into the wellbore 36 by the drill string during drilling operations, as part of a wired drill-pipe system. In yet another alternate embodiment, the rotary coring tool 100 is conveyed into the wellbore 36 as part of a measurement-while-drilling or logging-while-drilling tooling package on the drill string. In several exemplary embodiments, the drilling fluid (not shown) remains in the wellbore 36 during the sidewall coring operation so that the hydrostatic pressure within the wellbore 36 is maintained at a higher level than the hydrostatic pressure within the formation 14, thereby preventing hydrocarbons from migrating to the sea floor 16 through the wellbore 36.

Although FIG. 1 depicts a vertical wellbore, unless indicated otherwise, it should be understood by those skilled in the art that the apparatus according to the present disclosure is equally well suited for use in wellbores having other orientations including horizontal wellbores, slanted wellbores, multilateral wellbores or the like. Likewise, unless otherwise noted, even though FIG. 1 depicts an offshore operation, it should be understood by those skilled in the art that the apparatus according to the present disclosure is equally well suited for use in onshore operations and vice-versa. Further, unless otherwise noted, even though a Figure may depict a cased hole, it should be understood by those skilled in the art that the apparatus according to the present disclosure is equally well suited for use in open hole operations.

Figure 2A:
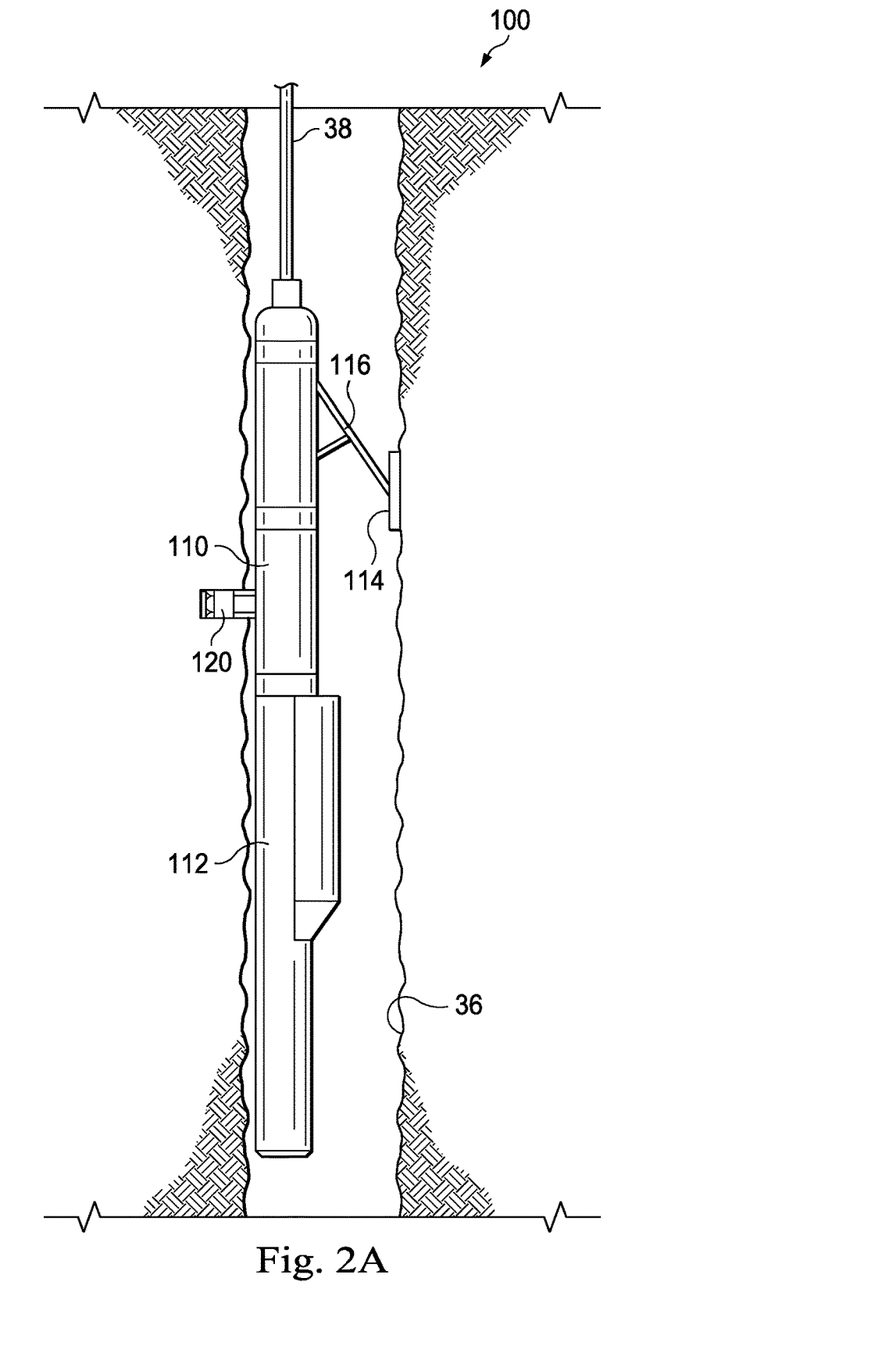
FIG. 2A is a detailed view of the rotary coring tool of FIG. 1 depicted while removing a core sample from the wellbore, the rotary coring tool including a sidewall coring section and a core receptacle section, according to an exemplary embodiment.
Figure 2B:
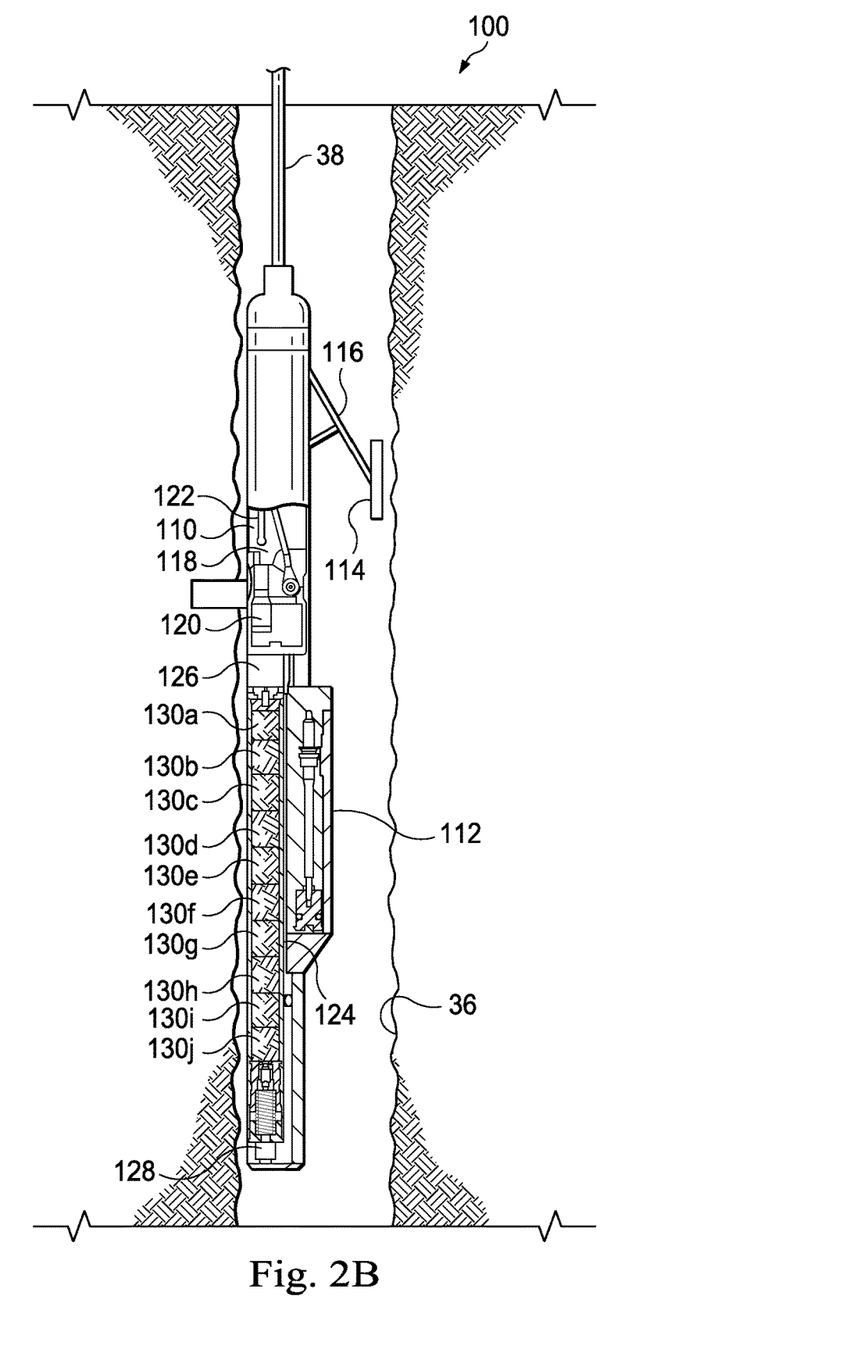
FIG. 2B is a detailed partial sectional view of the rotary coring tool of FIGS. 1 and 2A, the core receptacle section of the rotary coring tool including a pressure vessel in which the core samples are deposited, according to an exemplary embodiment.

In an exemplary embodiment, as illustrated in FIGS. 2A and 2B, the rotary coring tool 100 includes a sidewall coring section 110, a core receptacle section 112, and a coring stabilizer pad 114. The rotary coring tool 100 further includes an arm 116 connected to the coring stabilizer pad 114. The arm 116 is adapted to be extended when the rotary coring tool 100 is disposed within the wellbore 36, thereby displacing the coring stabilizer pad 114 against a sidewall of the wellbore 36 and forcing the sidewall coring section 110 against an opposing sidewall of the wellbore 36. The sidewall coring section 110 includes a bell crank 118, a coring bit 120, and a push rod 122 (shown in FIG. 2B). As shown in FIG. 2A, the bell crank 118 is adapted to displace the coring bit 120 to face the sidewall of the wellbore 36 when the stabilizer pad 114 is extended. The bell crank 118 is further adapted to displace the coring bit 120 into the sidewall of the wellbore 36 proximate the formation 14. The coring bit 120 is adapted to cut and detached a core sample from the sidewall of the wellbore 36 when it is thus displaced by the bell crank 118. In several exemplary embodiments, the coring bit 120 includes a finger to retain the core sample within the coring bit 120. As shown in FIG. 2B, the bell crank 118 is further adapted to retract the coring bit 120 and the core sample from the wall of the wellbore 36 and align the coring bit 120 with the core receptacle section 112. The push rod 122 is adapted to extend through the coring bit 120 when the coring bit 120 is aligned with the core receptacle section 112, thereby pushing the core sample out of the coring bit 120 and depositing the core sample into the core receptacle section 112.

In an exemplary embodiment, with continuing reference to FIGS. 2A and 2B, the core receptacle section 112 includes a pressure vessel 124 and a revolving cover mechanism 126. The core receptacle section 112 may also include a chemical chamber 128 adapted to store and/or dispense one or more chemicals (not shown) for use with one or more of the core samples such as, for example, core samples 130*a-j*. The pressure vessel 124 is adapted to receive the core samples 130*a-j* from the sidewall coring section 110 through an opening in the pressure vessel 124, which opening is selectively opened and closed by the revolving cover mechanism 126. In several exemplary embodiments, the core receptacle section 112 may be a stand-alone assembly adapted for use with another existing sidewall coring tool.

Figure 3:
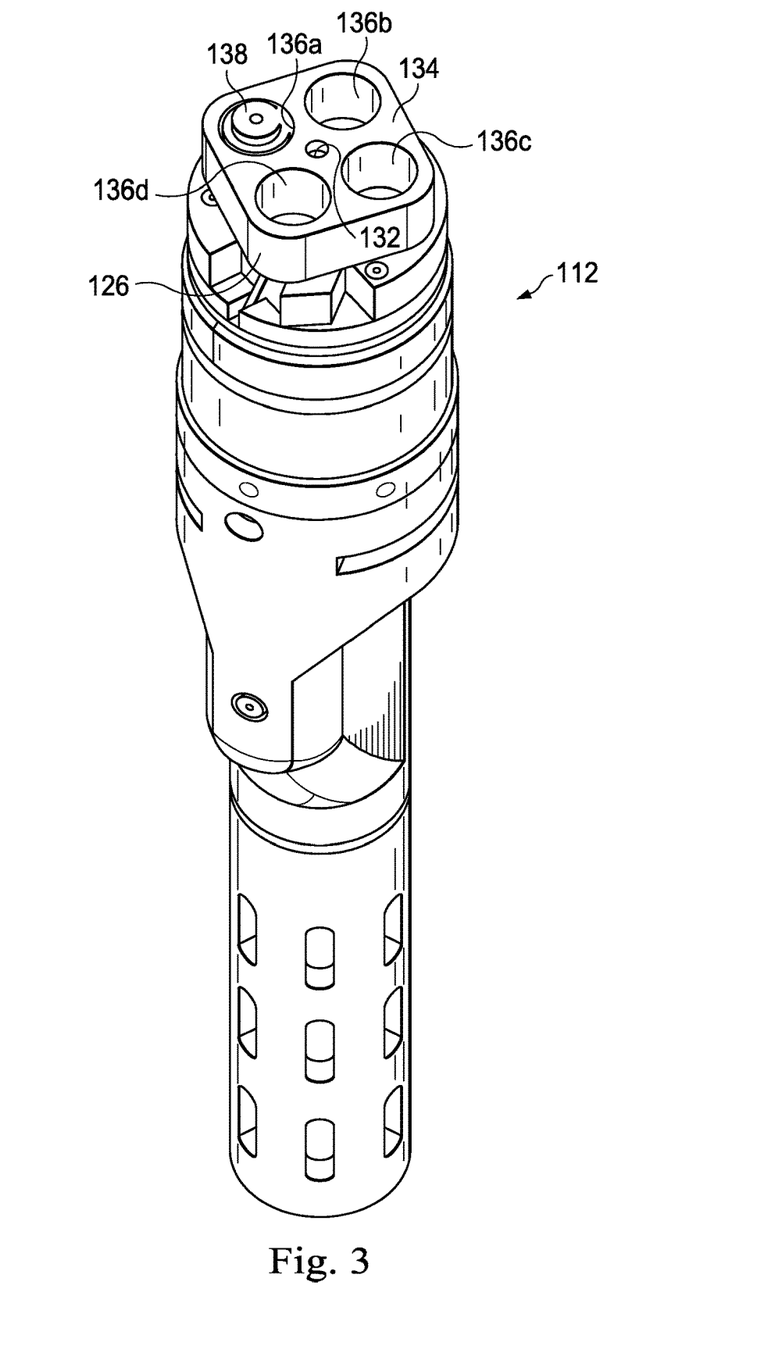
FIG. 3 is an elevational view of the core receptacle section of FIGS. 1, 2A and 2B, along the line 3-3 of FIG. 2A, the core receptacle section including a revolving carousel adapted to dispense various items into the pressure vessel, according to an exemplary embodiment.

In an exemplary embodiment, as illustrated in FIG. 3, the revolving cover mechanism 126 includes an actuator 132 and a revolving carousel 134. The actuator 132 is adapted to rotate the revolving carousel 134 and may take the form of a motor, a turbine, a cable-and-spring mechanism, another device capable of imparting angular displacement to the revolving carousel 134, or any combination thereof. The revolving carousel 134 defines a plurality of chambers such as, for example, chambers 136*a-d*. Although the revolving carousel 134 is depicted in FIG. 3 with four chambers, depending upon the particular requirements of the sidewall coring operation, the revolving carousel may include a lesser or greater number of chambers. One of the chambers 136*a-d* carries a cover plug 138, which is adapted to be pressed into the opening of the pressure vessel 124 by the push rod 122, thereby sealing the pressure vessel 124 for transport to the surface and, eventually, to an off-site laboratory where the core samples 130*a-j* may be tested and analyzed. The others of the chambers 136*a-d* are adapted to carry isolator plugs, swellable packers, discs, packaging film, other items for preserving the respective core samples 130*a-j*, or any combination thereof. The actuator 132 is adapted to rotate the revolving carousel 134 so that a selected one of the chambers 136*a-d* is aligned with the opening of the pressure vessel 124. Once aligned, the push rod 122 is capable of dispensing the contents of the selected chamber 136*a-d* into the opening of the pressure vessel 124.

Figure 4:
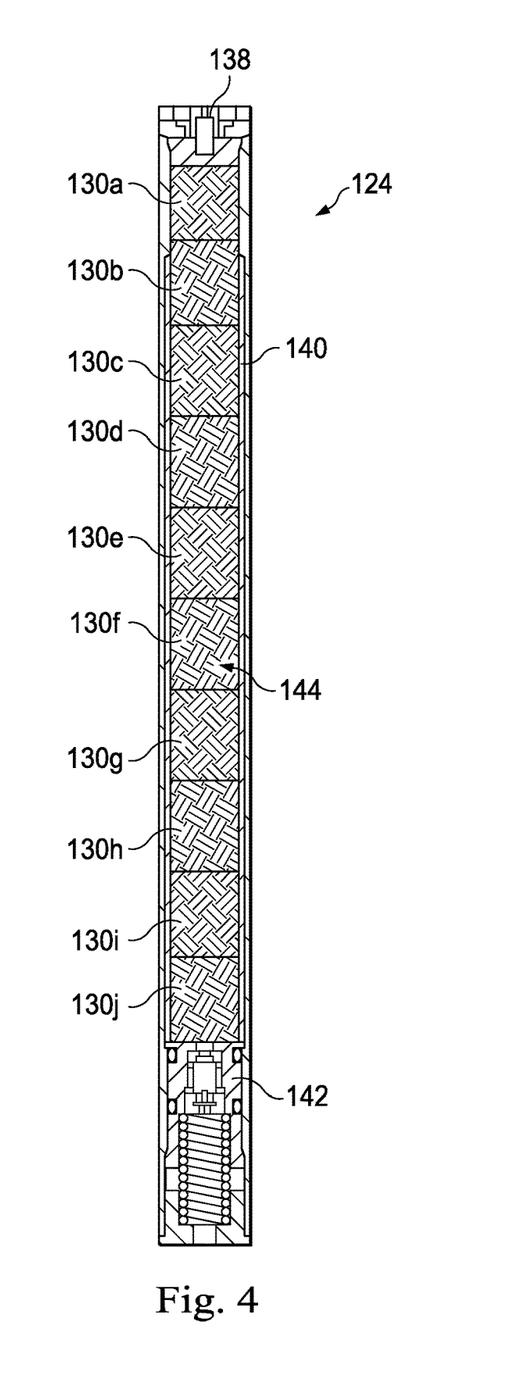
FIG. 4 is a detailed cross-sectional view of the pressure vessel of FIG. 2B, according to an exemplary embodiment.

In an exemplary embodiment, as illustrated in FIG. 4, the pressure vessel 124 includes the cover plug 138, a carrier tube 140, and a piston 142. The piston 142 is adapted to be progressively compressed when the core samples 130*a-j* are deposited into the carrier tube 140. Thus, the piston 142 is capable of maintaining an axial load on the core samples 130a-j within the carrier tube 140 as the pressure vessel 124 is brought to the surface. In addition to or instead of the piston 142, the pressure vessel 124 is also filled with a prefill fluid 144. The prefill fluid 144 supports the core samples 130a-j within the pressure vessel 124 and may be adapted to otherwise preserve the core samples 130a-j. As discussed the cover plug 138 is adapted to seal the core samples 130a-j, along with the prefill fluid 144, within the pressure vessel 124. Thus sealed, the pressure vessel 124 is capable of maintaining the core samples 130a-j at or near their respective in situ pressures as the pressure vessel 124 is brought to the surface. Further, in several exemplary embodiments, one or more of the items contained in the chambers 136a-d are disposed between one or more of the core samples 130a-j such that separate ones of the core samples 130a-j are maintained at different pressures. In several exemplary embodiments, the core receptacle section 112 also includes one or more heaters (not shown) located in, on, or near the pressure vessel 124. The heaters are adapted to apply heat to the core samples 130a-j in order to maintain the core samples 130a-j at a selected temperature as the pressure vessel 124 is brought to the surface. Thus, in several exemplary embodiments, the pressure vessel 124 is capable of maintaining the core samples 130a-j at or near their respective in situ temperatures as the pressure vessel 124 is brought to the surface. Further, in several exemplary embodiments, the heaters are placed so that separate ones of the core samples 130a-j are maintained at different temperatures.

In operation, in an exemplary embodiment, the rotary coring tool 100 is conveyed to a zone of interest within the wellbore 36 by the wireline 38, which is unwound from the wireline spool 32. Once it is determined that the rotary coring tool 100 has reached the zone of interest, the coring stabilizer pad 114 is extended such that the sidewall coring section 110 is forced against the sidewall of the wellbore 36. The bell crank 118 displaces the coring bit 120 to face the sidewall of the wellbore 36. The coring bit 120 is then rotated and displaced into the sidewall of the wellbore 36 by the bell crank 118, thereby cutting a respective one of the core samples 130a-j from the sidewall. The resulting core sample 130a-j is detached from the sidewall of the wellbore 36 when the coring bit 120 is retracted back into the rotary coring tool 100. The bell crank 118 aligns the coring bit 120 and the respective core sample 130a-j with the opening of the pressure vessel 124. In several exemplary embodiments, before each of the respective core samples 130a-j is deposited into the pressure vessel 124, the revolving carousel 134 must be displaced to a position in which it does not cover the opening of the pressure vessel 124. Alternately, each of the respective core samples 130a-j may be deposited into the pressure vessel 124 through a selected one of the chambers 136a-d, which chamber remains empty in order to thus accommodate the respective core sample 130a-j. Once the revolving carousel 134 is properly aligned or positioned by the actuator 132, the push rod 122 dispenses the core sample from the coring bit 120, through or past the revolving carousel 134, and into the pressure vessel 124. The push rod 122 is then withdrawn and the actuator 132 rotates the revolving carousel 124 to align a selected one of the chambers 136a-d with the opening of the pressure vessel 124. The contents of the selected chamber 136a-d may then be dispensed into the pressure vessel 124 by the push rod 122. As discussed above, depending upon the particular requirements of the sidewall coring operation, the chambers 136a-d may contain, for example, isolator plugs, swellable packers, discs, packaging film, the cover plug 138, other items for preserving the respective core samples 130a-j, or any combination thereof. Thus, after the respective core samples 130a-j have been deposited into the pressure vessel, one or more of the above listed items may be dispensed into the pressure vessel 124 in order to separate and/or preserve the core samples 130a-j. The above described process may be repeated by displacing the rotary coring tool 100 to other locations within the wellbore 36. In this manner, the core samples 130a-j may be collected from multiple zones of interest within the wellbore 36 and/or from multiple locations within each zone of interest. Once the sidewall coring operation is complete, the push rod 122 seals the pressure vessel 124 with the cover plug 138 and the rotary coring tool 100 is returned to the surface. The pressure vessel 124 can then be removed from the rotary coring tool 100 and shipped to an off-site laboratory for testing and analysis.

Figure 5:
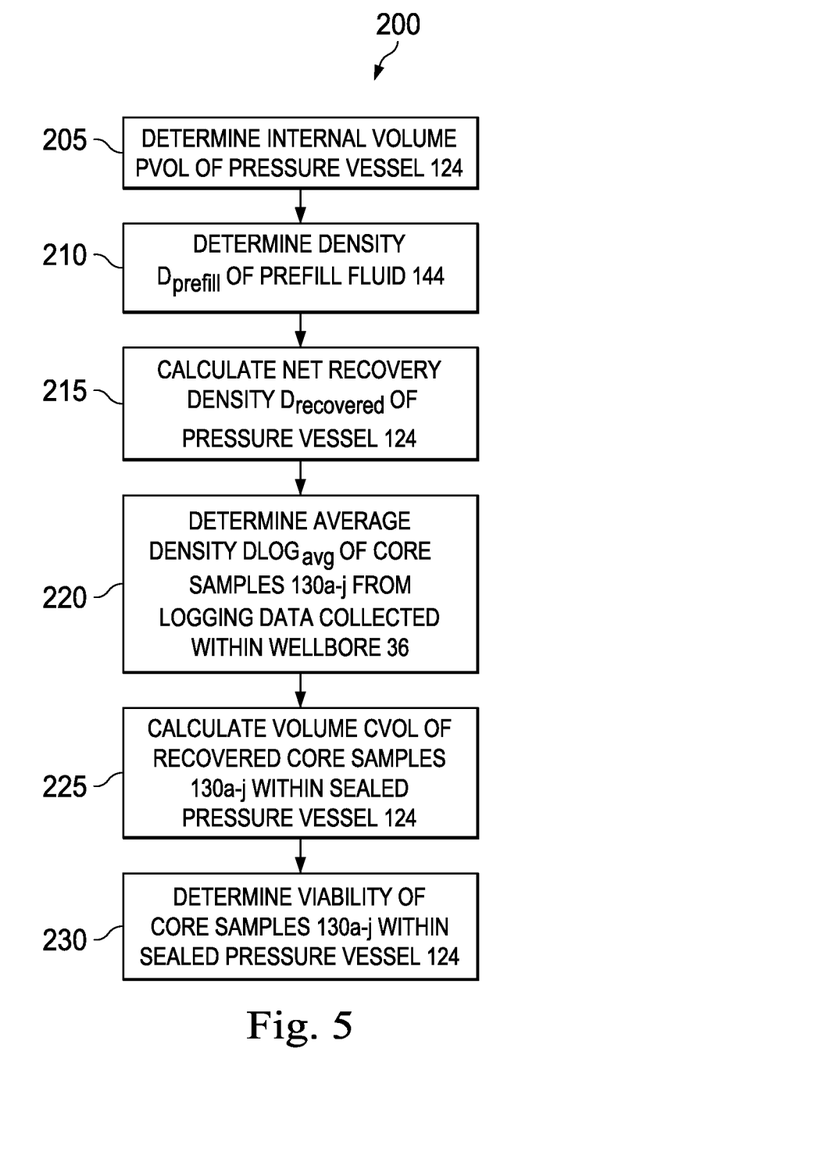
FIG. 5 is a flow-chart diagram illustrating a method for determining the volume of core samples disposed within the pressure vessel of FIG. 4.

In an exemplary embodiment, as illustrated in FIG. 5, a method of determining the volume of core samples 130a-j recovered from the wellbore 36 within the sealed pressure vessel 124 is generally referred to by the reference numeral 200. As the sealed pressure vessel 124 cannot be opened and examined before it is brought to a laboratory for testing and analysis, the method 200 provides knowledge of the actual rock volume recovery of the core samples 130a-j before the pressure vessel 124 is transported from the wellsite to an off-site laboratory. Such knowledge allows for additional sidewall coring operations to be conducted if necessary, while the required equipment and personnel are still available at the wellsite. The method 200 includes determining the internal volume PVOL of the pressure vessel 124 at step 205; determining the density $D_{prefill}$ of the prefill fluid 144 at step 210; calculating the net recovery density $D_{recovered}$ of the pressure vessel 124 at step 215; determining the average density $DLOG_{avg}$ of the core samples 130a-j from logging data collected within the wellbore 36 at step 220; calculating the volume CVOL of the recovered core samples 130a-j within the sealed pressure vessel 124 at step 225; and determining the viability of the core samples 130a-j in the sealed pressure vessel 124 by comparing the actual rock volume CVOL of the recovered core samples 130a-j to the internal volume PVOL of the pressure vessel 124 at step 230.

At the step 205, as shown in FIG. 5, the internal volume PVOL of the pressure vessel 124 is determined. In an exemplary embodiment, the internal volume PVOL of the pressure vessel 124 is determined by filling the pressure vessel 124 with a surrogate liquid and subsequently measuring the volume of the surrogate liquid with a volumetric measuring device such as, for example, a graduated cylinder. In an alternate embodiment, the volume of the surrogate liquid can be measured by determining the mass of the liquid contained within the pressure vessel and dividing by a known density of the liquid. In another alternate embodiment, the internal volume PVOL of the pressure vessel 124 is determined by measuring the geometric properties of the pressure vessel 124 and calculating the internal volume PVOL from the geometric properties. Although example embodiments of the step 205 have been disclosed, one or more other processes may be used to determine the internal volume PVOL of the pressure vessel 124.

At the step 210, as shown in FIG. 5, the density $D_{prefill}$ of the prefill fluid 144 is determined. In an exemplary embodiment, the density $D_{prefill}$ of the prefill fluid 144 is determined by filling the pressure vessel 124 with the prefill fluid 144 and subsequently determining the mass of the prefill fluid 144 in the pressure vessel 124. The density $D_{prefill}$ of the prefill fluid 144 is then calculated by dividing the mass of the prefill fluid 144 by the internal volume PVOL of the pressure vessel, as determined at step 205. Alternatively, where the identity and/or relative make-up of the prefill fluid 144 is known, the density $D_{prefill}$ of the prefill fluid 144 can be calculated from known values. Although example embodiments of the step 210 have been disclosed, one or more other processes may be used to determine the density $D_{prefill}$ of the prefill fluid 144.

At the step 215, as shown in FIG. 5, the net recovery density $D_{recovered}$ of the pressure vessel 124 is calculated. In an exemplary embodiment, the net recovery density $D_{recovered}$ of the pressure vessel 124 is calculated by first determining the mass of the empty pressure vessel 124. In some embodiments, the mass of the empty pressure vessel 124 includes the mass of the prefill fluid 144. Next, once the sidewall coring operation is complete, the sealed pressure vessel 124 is recovered from the wellbore 36 and the mass of the sealed pressure vessel 124 is determined. The mass of the recovered materials within the pressure vessel 124 can then be determined by subtracting the mass of the empty pressure vessel from the mass of the sealed pressure vessel 124 recovered from the wellbore 36. Finally, the net recovery density $D_{recovered}$ of the materials in the sealed pressure vessel 124 is determined by dividing the mass of the recovered materials within the pressure vessel 124 by the internal volume PVOL of the pressure vessel 124, as determined at step 205. Although an example embodiment of the step 215 has been disclosed, one or more other processes may be used to calculate the net recovery density $D_{recovered}$ of the pressure vessel 124.

At the step 220, as shown in FIG. 5, the average density $DLOG_{avg}$ of the earth strata proximate the respective in situ locations of the core samples 130a-j is determined from logging data collected within the wellbore 36. In an exemplary embodiment, one or more well tools are utilized to collect the logging data within the wellbore 36 in order to determine the rock density of the formation 14 proximate the respective in situ locations of the core samples 130a-j. The one or more well tools may include, for example, measurement-while-drilling ("MWD") tools and/or logging-while-drilling ("LWD") tools. The one or more well tools may be adapted to measure the physical properties of the wellbore 36, such as, for example, pressure, temperature, and wellbore trajectory in three-dimensional space. Further, the one or more well tools may be adapted to measure the physical properties of the formation 14 by utilizing, for example, gamma ray logs, sonic velocity logs, resistivity logs, and density logs, among others. In an exemplary embodiment, mud logs are utilized to determine the rock density of the formation 14 proximate the respective in situ locations of the core samples 130a-j. The respective rock densities from the in situ locations of each core sample 130a-j are then summed. Finally, in order to determine the average rock density $DLOG_{avg}$ proximate the respective in situ locations of the core samples 130a-j, the sum of the respective rock densities from said locations is divided by the total number of core samples 130a-j deposited into the pressure vessel 124. Although example embodiments of the step 220 have been disclosed, one or more other processes may be used to determine the average rock density $DLOG_{avg}$ proximate the respective in situ locations of the core samples 130a-j.

At the step 225, as shown in FIG. 5, the volume CVOL of the core samples 130a-j recovered from the wellbore 36 in the sealed pressure vessel 124 is calculated. In an exemplary embodiment, the volume CVOL of the core samples 130a-j is calculated by first determining a volume conversion ratio. The numerator of the volume conversion ratio is obtained by subtracting the average rock density $DLOG_{avg}$ proximate the respective in situ locations of the core samples 130a-j, as determined at step 220, from the net recovery density $D_{recovered}$ of the pressure vessel 124, as calculated at step 215. Similarly, the denominator of the volume conversion ratio is obtained by subtracting the average rock density $DLOG_{avg}$ proximate the respective in situ locations of the core samples 130a-j, as determined at step 220, from the density $D_{prefill}$ of the prefill fluid 144 in the pressure vessel 124, as determined at the step 210. Finally, in order to calculate the volume CVOL of the core samples 130a-j in the sealed pressure vessel 124, the internal volume PVOL of the pressure vessel 124, as determined at step 205, is multiplied by the sum of one minus the volume conversion ratio. The process for calculating the volume CVOL of the core samples 130a-j in the sealed pressure vessel 124 is shown below as an equation:

$$CVOL = PVOL \times \left(1 - \frac{D_{recovered} - DLOG_{avg}}{D_{prefill} - DLOG_{avg}}\right)$$

At the step 230, the viability of the core samples 130a-j in the sealed pressure vessel 124 is determined by comparing the volume CVOL of the recovered core samples 130a-j to the internal volume PVOL of the pressure vessel 124. In an exemplary embodiment, the viability of the core samples 130a-j is determined by first calculating a volume conversion ratio that represents a comparison between the internal volume of the pressure vessel 124 and the calculated volume of the plurality of core samples 130a-j disposed within the pressure vessel 124. The viability of the core samples 130a-j in the sealed pressure vessel 124 is then determined by evaluating whether the volume conversion ratio exceeds a predetermined threshold that is based on one or more characteristics of the one or more earth strata.

In several exemplary embodiments, the method 200 provides a determination of the rock volume of the core samples 130a-j within the pressure vessel 124 without requiring the sealed pressure vessel 124 to be opened. In several exemplary embodiments, the method 200 provides a determination of the core sample recovery within an opaque and sealed pressure vessel 124 through analysis of the recovered weight of the pressure vessel 124 and the interior volume of the pressure vessel 124. In several exemplary embodiments, the sealed pressure vessel 124 containing the core samples 130a-j cannot be opened and examined at the wellsite and thus the volume of the core samples 130a-j within the pressure vessel 124 is unknown. The method 200 provides knowledge of actual rock volume recovery within the sealed pressure vessel 124 prior to shipment of the pressure vessel 124 from the wellsite, which is an important operational requirement. Such knowledge allows for additional sidewall coring operations to be performed as necessary, while the required equipment and personnel are still available at the wellsite.

In several exemplary embodiments, a plurality of instructions, or computer program(s), are stored on a non-transitory computer readable medium, the instructions or computer program(s) being accessible to, and executable by, one or more processors. In several exemplary embodiments, the one or more processors execute the plurality of instructions (or computer program(s)) to repeatedly execute at least the method 200. In several exemplary embodiments, the one or more processors are part of one or more computing devices.

In several exemplary embodiments, the non-transitory computer readable medium is part of the one or more computing devices.

Figure 6:
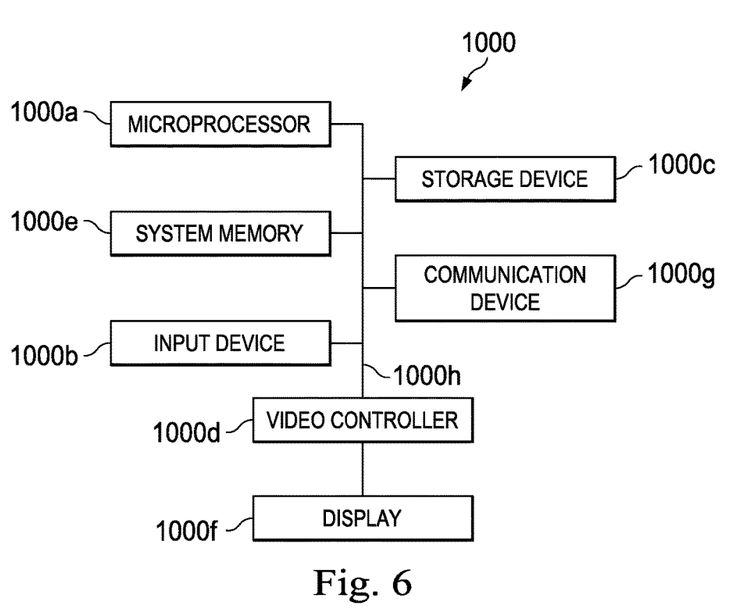
FIG. 6 is a diagrammatic illustration of a computing device for implementing one or more exemplary embodiments of the present disclosure, according to an exemplary embodiment.

In an exemplary embodiment, as illustrated in FIG. 6 with continuing reference to FIGS. 1-5, an illustrative node 1000 for implementing one or more embodiments of one or more of the above-described networks, elements, methods and/or steps, and/or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer-readable medium that may contain executable instructions. In several exemplary embodiments, the communication device 1000g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the components of the rotary coring tool 100 include at least the node 1000 and/or components thereof, and/or one or more nodes that are substantially similar to the node 1000 and/or components thereof. In several exemplary embodiments, one or more of the above-described components of the node 1000 and/or the rotary coring tool 100, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, any networks and/or one or more portions thereof, may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a non-transitory computer readable medium may be executed by one or more processors to cause the one or more processors to carry out or implement in whole or in part the above-described operation of each of the above-described exemplary embodiments of the rotary coring tool 100, the method 200, and/or any combination thereof. In several exemplary embodiments, such a processor may include one or more of the microprocessor 1000a, any processor(s) that are part of the components of the rotary coring tool 100, and/or any combination thereof, and such a computer readable medium may be distributed among one or more components of the rotary coring tool 100. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

The present disclosure introduces a method for determining the volume of a plurality of core samples disposed within a sealed pressure vessel, the sealed pressure vessel containing a prefill fluid having a density, the method including determining the internal volume of the pressure vessel; determining the density of the prefill fluid; determining, using at least one of one or more computers, the net density of the plurality of core samples disposed within the sealed pressure vessel; determining, using at least one of the one or more computers, the density of one or more earth strata proximate the respective in situ locations of the plurality of core samples; and calculating, using at least one of the one or more computers, the volume of the plurality of core samples disposed within the sealed pressure vessel; wherein the calculation of the volume of the plurality of core samples disposed within the sealed pressure vessel is based on the internal volume of the pressure vessel, the density of the prefill fluid, the net density of the plurality of core samples, and the density of the one or more earth strata. In an exemplary embodiment, the method further includes determining, using at least one of the one or more computers, the viability of the plurality of core samples disposed within the sealed pressure vessel, including calculating a volume conversion ratio by comparing the internal volume of the pressure vessel with the calculated volume of the plurality of core samples within the pressure vessel; and determining whether the volume conversion ratio exceeds a predetermined threshold; wherein the predetermined threshold is based on one or more characteristics of the one or more earth strata. In an exemplary embodiment, the method further includes sealing the plurality of core samples within the pressure vessel when the pressure vessel is disposed within a wellbore that traverses the one or more earth strata; and wherein the plurality of core samples are sealed within the pressure vessel at or near their respective in situ pressures. In an exemplary embodiment, determining the density of the one or more earth strata proximate the respective in situ locations of the plurality of core samples includes at least one of: collecting logging data within the wellbore using one or more well tools, wherein the respective densities of the one or more earth strata are determined from the logging data; and analyzing mud logs of the wellbore, wherein the respective densities of drill cuttings excavated proximate the one or more earth strata are determined from the mud logs. In an exemplary embodiment, determining the internal volume of the pressure vessel includes at least one of: filling the pressure vessel with a surrogate liquid and subsequently measuring the volume of the surrogate liquid; and measuring the geometric properties of the pressure vessel and calculating the internal volume of the pressure vessel using the geometric properties. In an exemplary embodiment, determining the density of the prefill fluid includes: determining the mass of the prefill fluid within the pressure vessel; and calculating the density of the prefill fluid using the mass of the prefill fluid within the pressure vessel and the internal volume of the pressure vessel. In an exemplary embodiment, determining the net density of the plurality of core samples disposed within the sealed pressure vessel includes calculating the mass of the plurality of core samples within the pressure vessel using the mass of the pressure vessel alone and the mass of the sealed pressure vessel with the plurality of core samples disposed therein; and calculating the net density of the plurality of core samples using the internal volume of the pressure vessel and the mass of the plurality of core samples within the pressure vessel.

The present disclosure also introduces a method for determining the volume of a plurality of core samples recovered from a wellbore, the method including collecting the plurality of core samples from the wellbore with a coring tool, the coring tool including a coring bit adapted to cut each of the plurality of core samples from the wellbore, a pressure vessel containing a prefill fluid having a density, the pressure vessel being adapted to receive each of the plurality of core samples from the coring bit, and a sealing member adapted to seal the pressure vessel; sealing the plurality of core samples in the pressure vessel using the sealing member; determining the density of the prefill fluid; determining the net density of the plurality of core samples disposed within the sealed pressure vessel; determining the density of one or more earth strata proximate the respective in situ locations of the plurality of core samples; and calculating the volume of the plurality of core samples disposed within the sealed pressure vessel; wherein the calculation of the volume of the plurality of core samples disposed within the sealed pressure vessel is based on the density of the prefill fluid, the net density of the plurality of core samples, and the density of the one or more earth strata. In an exemplary embodiment, the method further includes determining the internal volume of the pressure vessel; wherein calculating the volume of the plurality of core samples disposed within the sealed pressure vessel is further based on the internal volume of the pressure vessel. In an exemplary embodiment, determining the internal volume of the pressure vessel includes at least one of: filling the pressure vessel with a surrogate liquid and subsequently measuring the volume of the surrogate liquid; and measuring the geometric properties of the pressure vessel and calculating the internal volume of the pressure vessel using the geometric properties. In an exemplary embodiment, the coring tool further includes a revolving carousel operably coupled to the pressure vessel and defining a plurality of chambers, wherein one or more of the plurality of chambers contains at least one of: a plug, a disc, a swellable packer, and a film; and a push rod adapted to dispense the contents of each of the plurality of chambers into the pressure vessel. In an exemplary embodiment, collecting the plurality of core samples from the wellbore with the coring tool includes conveying the rotary coring tool to one or more zones of interest within the wellbore; cutting each of the plurality of core samples from the wellbore with the coring bit; depositing each of the plurality of core samples from the coring bit into the pressure vessel with the push rod; aligning a selected one of the plurality of chambers defined by the revolving carousel with the pressure vessel; and dispensing the contents of the selected chamber into the pressure vessel. In an exemplary embodiment, the plurality of core samples are sealed within the pressure vessel while the pressure vessel is disposed within the wellbore; and wherein the plurality of core samples are sealed within the pressure vessel at or near their respective in situ pressures. n an exemplary embodiment, determining the density of the one or more earth strata proximate the respective in situ locations of the plurality of core samples includes at least one of: collecting logging data within the wellbore using one or more well tools, wherein the respective densities of the one or more earth strata are determined from the logging data; and analyzing mud logs of the wellbore, wherein the respective densities of drill cuttings excavated proximate the one or more earth strata are determined from the mud logs. In an exemplary embodiment, the method further includes determining the viability of the plurality of core samples disposed within the sealed pressure vessel, including calculating a volume conversion ratio by comparing the internal volume of the pressure vessel with the calculated volume of the plurality of core samples within the pressure vessel; and determining whether the volume conversion ratio exceeds a predetermined threshold; wherein the predetermined threshold is based on the one or more characteristics of the subterranean formation. In an exemplary embodiment, determining the density of the prefill fluid includes determining the mass of the prefill fluid within the pressure vessel; and calculating the density of the prefill fluid using the mass of the prefill fluid within the pressure vessel and the internal volume of the pressure vessel. In an exemplary embodiment, determining the net density of the plurality of core samples disposed within the sealed pressure vessel includes calculating the mass of the plurality of core samples within the pressure vessel using the mass of the pressure vessel alone and the mass of the sealed pressure vessel with the plurality of core samples disposed therein; and calculating the net density of the plurality of core samples using the internal volume of the pressure vessel and the mass of the plurality of core samples within the pressure vessel.

The present disclosure also introduces an apparatus for determining the volume of a plurality of core samples disposed within a sealed pressure vessel, the sealed pressure vessel containing a prefill fluid having a density, the apparatus including a non-transitory computer readable medium; and a plurality of instructions stored on the non-transitory computer readable medium and executable by one or more processors, the plurality of instructions including instructions that cause the one or more processors to determine the density of the prefill fluid; instructions that cause the one or more processors to determine the net density of the plurality of core samples disposed within the sealed pressure vessel; instructions that cause the one or more processors to determine the density of one or more earth strata proximate the respective in situ locations of the plurality of core samples; and instructions that cause the one or more processors to calculate the volume of the plurality of core samples disposed within the sealed pressure vessel; wherein the calculation of the volume of the plurality of core samples disposed within the sealed pressure is based on the density of the prefill fluid, the net density of the plurality of core samples, and the density of the one or more earth strata. In an exemplary embodiment, the instructions that cause the one or more processors to determine the net density of the plurality of core samples disposed within the sealed pressure vessel include instructions to calculate the mass of the plurality of core samples within the pressure vessel using on the mass of the pressure vessel alone and the mass of the sealed pressure vessel with the plurality of core samples disposed therein; and instructions to calculate the net density of the plurality of core samples using the internal volume of the pressure vessel and the mass of the plurality of core samples within the pressure vessel. In an exemplary embodiment, the instructions that cause the one or more processors to determine the density of the one or more earth strata proximate the respective in situ locations of the plurality of core samples include at least one of: instructions to collect logging data within the wellbore using one or more well tools, wherein the respective densities of the one or more earth strata are determined from the logging data; and instructions to analyze mud logs of the wellbore, wherein the respective densities of drill cuttings excavated proximate the one or more earth strata are determined from the mud logs.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

Although several exemplary embodiments have been disclosed in detail above, the embodiments disclosed are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method for determining the volume of a plurality of core samples disposed within a sealed pressure vessel, the sealed pressure vessel containing a prefill fluid having a density, the method comprising:
   determining the internal volume of the pressure vessel;
   determining the density of the prefill fluid;
   determining, using at least one of one or more computers, the net density of the plurality of core samples disposed within the sealed pressure vessel;
   determining, using at least one of the one or more computers, the density of one or more earth strata proximate the respective in situ locations of the plurality of core samples; and
   calculating, using at least one of the one or more computers, the volume of the plurality of core samples disposed within the sealed pressure vessel;
   wherein the calculation of the volume of the plurality of core samples disposed within the sealed pressure vessel is based on the internal volume of the pressure vessel, the density of the prefill fluid, the net density of the plurality of core samples, and the density of the one or more earth strata.

2. The method as recited in claim 1, wherein the method further comprises determining, using at least one of the one or more computers, the viability of the plurality of core samples disposed within the sealed pressure vessel, comprising:
   calculating a volume conversion ratio by comparing the internal volume of the pressure vessel with the calculated volume of the plurality of core samples within the pressure vessel; and
   determining whether the volume conversion ratio exceeds a predetermined threshold;
   wherein the predetermined threshold is based on one or more characteristics of the one or more earth strata.

3. The method as recited in claim 1, wherein the method further comprises sealing the plurality of core samples within the pressure vessel when the pressure vessel is disposed within a wellbore that traverses the one or more earth strata; and wherein the plurality of core samples are sealed within the pressure vessel at or near their respective in situ pressures.

4. The method as recited in claim 3, wherein determining the density of the one or more earth strata proximate the respective in situ locations of the plurality of core samples comprises at least one of:
collecting logging data within the wellbore using one or more well tools, wherein the respective densities of the one or more earth strata are determined from the logging data; and
analyzing mud logs of the wellbore, wherein the respective densities of drill cuttings excavated proximate the one or more earth strata are determined from the mud logs.

5. The method as recited in claim 1, wherein determining the internal volume of the pressure vessel comprises at least one of:
filling the pressure vessel with a surrogate liquid and subsequently measuring the volume of the surrogate liquid; and
measuring the geometric properties of the pressure vessel and calculating the internal volume of the pressure vessel using the geometric properties.

6. The method as recited in claim 1, wherein determining the density of the prefill fluid comprises:
determining the mass of the prefill fluid within the pressure vessel; and
calculating the density of the prefill fluid using the mass of the prefill fluid within the pressure vessel and the internal volume of the pressure vessel.

7. The method as recited in claim 1, wherein determining the net density of the plurality of core samples disposed within the sealed pressure vessel comprises:
calculating the mass of the plurality of core samples within the pressure vessel using the mass of the pressure vessel alone and the mass of the sealed pressure vessel with the plurality of core samples disposed therein; and
calculating the net density of the plurality of core samples using the internal volume of the pressure vessel and the mass of the plurality of core samples within the pressure vessel.

8. A method for determining the volume of a plurality of core samples recovered from a wellbore, the method comprising:
collecting the plurality of core samples from the wellbore with a coring tool, the coring tool comprising:
a coring bit adapted to cut each of the plurality of core samples from the wellbore;
a pressure vessel containing a prefill fluid having a density, the pressure vessel being adapted to receive each of the plurality of core samples from the coring bit; and
a sealing member adapted to seal the pressure vessel;
sealing the plurality of core samples in the pressure vessel using the sealing member;
determining the density of the prefill fluid;
determining the net density of the plurality of core samples disposed within the sealed pressure vessel;
determining the density of one or more earth strata proximate the respective in situ locations of the plurality of core samples; and
calculating the volume of the plurality of core samples disposed within the sealed pressure vessel;
wherein the calculation of the volume of the plurality of core samples disposed within the sealed pressure vessel is based on the density of the prefill fluid, the net density of the plurality of core samples, and the density of the one or more earth strata.

9. The method as recited in claim 8, wherein the method further comprises determining the internal volume of the pressure vessel; and
wherein calculating the volume of the plurality of core samples disposed within the sealed pressure vessel is further based on the internal volume of the pressure vessel.

10. The method as recited in claim 9, wherein determining the internal volume of the pressure vessel comprises at least one of:
filling the pressure vessel with a surrogate liquid and subsequently measuring the volume of the surrogate liquid; and
measuring the geometric properties of the pressure vessel and calculating the internal volume of the pressure vessel using the geometric properties.

11. The method as recited in claim 8, wherein the coring tool further comprises:
a revolving carousel operably coupled to the pressure vessel and defining a plurality of chambers, wherein one or more of the plurality of chambers contains at least one of: a plug, a disc, a swellable packer, and a film; and
a push rod adapted to dispense the contents of each of the plurality of chambers into the pressure vessel.

12. The method as recited in claim 11, wherein collecting the plurality of core samples from the wellbore with the coring tool comprises:
conveying the rotary coring tool to one or more zones of interest within the wellbore;
cutting each of the plurality of core samples from the wellbore with the coring bit;
depositing each of the plurality of core samples from the coring bit into the pressure vessel with the push rod;
aligning a selected one of the plurality of chambers defined by the revolving carousel with the pressure vessel; and
dispensing the contents of the selected chamber into the pressure vessel.

13. The method as recited in claim 12, wherein the plurality of core samples are sealed within the pressure vessel while the pressure vessel is disposed within the wellbore; and
wherein the plurality of core samples are sealed within the pressure vessel at or near their respective in situ pressures.

14. The method as recited in claim 8, wherein determining the density of the one or more earth strata proximate the respective in situ locations of the plurality of core samples comprises at least one of:
collecting logging data within the wellbore using one or more well tools, wherein the respective densities of the one or more earth strata are determined from the logging data; and
analyzing mud logs of the wellbore, wherein the respective densities of drill cuttings excavated proximate the one or more earth strata are determined from the mud logs.

15. The method as recited in claim 8, wherein the method further comprises determining the viability of the plurality of core samples disposed within the sealed pressure vessel, comprising:

calculating a volume conversion ratio by comparing the internal volume of the pressure vessel with the calculated volume of the plurality of core samples within the pressure vessel; and determining whether the volume conversion ratio exceeds a predetermined threshold;

wherein the predetermined threshold is based on the one or more characteristics of the subterranean formation.

16. The method as recited in claim 8, wherein determining the density of the prefill fluid comprises:

determining the mass of the prefill fluid within the pressure vessel; and calculating the density of the prefill fluid using the mass of the prefill fluid within the pressure vessel and the internal volume of the pressure vessel.

17. The method as recited in claim 8, wherein determining the net density of the plurality of core samples disposed within the sealed pressure vessel comprises:

calculating the mass of the plurality of core samples within the pressure vessel using the mass of the pressure vessel alone and the mass of the sealed pressure vessel with the plurality of core samples disposed therein; and calculating the net density of the plurality of core samples using the internal volume of the pressure vessel and the mass of the plurality of core samples within the pressure vessel.

18. An apparatus for determining the volume of a plurality of core samples disposed within a sealed pressure vessel, the sealed pressure vessel containing a prefill fluid having a density, the apparatus comprising:

a non-transitory computer readable medium; and a plurality of instructions stored on the non-transitory computer readable medium and executable by one or more processors, the plurality of instructions comprising:

instructions that cause the one or more processors to determine the net density of the plurality of core samples disposed within the sealed pressure vessel;

instructions that cause the one or more processors to determine the density of one or more earth strata proximate the respective in situ locations of the plurality of core samples; and instructions that cause the one or more processors to calculate the volume of the plurality of core samples disposed within the sealed pressure vessel;

wherein the calculation of the volume of the plurality of core samples disposed within the sealed pressure is based on the density of the prefill fluid, the net density of the plurality of core samples, and the density of the one or more earth strata.

19. The apparatus as recited in claim 18, wherein the instructions that cause the one or more processors to determine the net density of the plurality of core samples disposed within the sealed pressure vessel comprise:

instructions to calculate the mass of the plurality of core samples within the pressure vessel using on the mass of the pressure vessel alone and the mass of the sealed pressure vessel with the plurality of core samples disposed therein; and instructions to calculate the net density of the plurality of core samples using the internal volume of the pressure vessel and the mass of the plurality of core samples within the pressure vessel.

20. The apparatus as recited in claim 18, wherein the instructions that cause the one or more processors to determine the density of the one or more earth strata proximate the respective in situ locations of the plurality of core samples comprise at least one of:

instructions to collect logging data within the wellbore using one or more well tools, wherein the respective densities of the one or more earth strata are determined from the logging data; and instructions to analyze mud logs of the wellbore, wherein the respective densities of drill cuttings excavated proximate the one or more earth strata are determined from the mud logs.

* * * * *